United States Patent [19]
Maubray

[11] Patent Number: 5,943,728
[45] Date of Patent: Aug. 31, 1999

[54] SCREEN WIPER BLADE HAVING IMPROVED MEANS FOR FASTENING AN ACCESSORY, AND A SCREEN WIPER HAVING SUCH A BLADE

[75] Inventor: Daniel Maubray, Issy-Les-Moulineaux, France

[73] Assignee: Valeo Systemes D'Essuyage, La Verriere, France

[21] Appl. No.: 08/671,263

[22] Filed: Jun. 26, 1996

[30] Foreign Application Priority Data

Jun. 28, 1995 [FR] France ................................. 95.07886

[51] Int. Cl.⁶ ................................. B60S 1/46; B60S 1/38
[52] U.S. Cl. ................................. 15/250.04; 15/250.201; 15/250.44; 15/250.451; 15/250.452
[58] Field of Search .................. 15/250.44, 250.451, 15/250.452, 250.453, 250.454, 250.46, 250.48, 250.201, 250.08, 250.04, 250.361, 250.41

[56] References Cited

U.S. PATENT DOCUMENTS

| 5,218,735 | 6/1993 | Maubray | 15/250.201 |
| 5,392,489 | 2/1995 | Mohnach | 15/250.201 |

FOREIGN PATENT DOCUMENTS

| 0 429 334 | 5/1991 | European Pat. Off. . |
| 2 648 771 | 12/1990 | France . |

*Primary Examiner*—Gary K. Graham
*Attorney, Agent, or Firm*—Morgan & Finnegan, LLP

[57] ABSTRACT

A motor vehicle screen wiper blade comprises an articulated structure which carries, by means of a set of grips, a wiping strip of flexible material which it applies against the glass surface to be swept, so that the wiping strip follows the curvature of the latter. The grips grasp a longitudinal support or claw portion of the wiping strip, and the wiper blade includes at least one accessory such as a flexible aerodynamic deflector. The accessory includes at least one fastening lug for fastening it on the blade, this fastening lug being interposed between a grip of the latter and the claw portion of the wiping strip.

15 Claims, 4 Drawing Sheets

SCREEN WIPER BLADE HAVING IMPROVED MEANS FOR FASTENING AN ACCESSORY, AND A SCREEN WIPER HAVING SUCH A BLADE

FIELD OF THE INVENTION

This invention relates to screen wiper blades for motor vehicles, of the type comprising an articulated structure which is deformable in a longitudinal plane at right angles to a glass surface to be wiped (otherwise referred to as a swept surface), which may for example be the windshield of a vehicle.

More particularly, the invention relates to such a wiper blade in which the articulated structure carries, by means of a series of grips or claw elements, a wiping strip of a flexible material, which is applied by the articulated structure against the swept surface in such a way that the wiping strip follows the curvature of the swept surface, with the grips grasping a longitudinal support or claw portion of the wiping strip so as to secure the latter in place, the wiper blade further including at least one vertebra for stiffening the wiping strip, this vertebra extending substantially over the whole length of the claw portion, the wiping strip being retained against longitudinal movement with respect to the articulated structure, and the wiper blade, finally, including at least one accessory such as an aerodynamic deflector, which is mounted on the remainder of the blade.

BACKGROUND OF THE INVENTION

It is known to equip a screen wiper blade with various accessories, such as an aerodynamic deflector or a device for projecting washing fluid on to the swept surface. These accessories are generally fixed on a main yoke of the articulated structure of the wiper blade, by riveting or by resilient attachment means. These methods of fastening ernable aerodynamic deflectors in particular, of large size, or spray pipes, to be fitted. However, it is desirable that such accessories should be located as close as possible to the swept surface, and in particular as close as possible to the wiping strip.

For example, since the function of an aerodynamic deflector is to divert eddies of air which may tend to damage the wiping strip and be detrimental to its proper operation, it is desirable to locate the deflector as close as possible to the wiping strip, close to the swept surface. In this connection it has been found convenient to use a flexible aerodynamic deflector which is located as close as possible to the wiping strip, and which is able to follow the deformations of the latter.

DISCUSSION OF THE INVENTION

An object of the invention is to provide a solution to the problem of fastening such an accessory.

According to the invention in a first aspect, a screen wiper blade for a motor vehicle, the blade being firstly of the type comprising an articulated structure which is deformable in a longitudinal plane perpendicular to a swept surface and which carries, by means of a series of grips, a wiping strip of flexible material which it applies against the swept surface so that the wiping strip follows the curvature of the swept surface, secondly of the type in which the grips grasp a longitudinal claw portion of the wiping strip so as to fasten the latter in place, thirdly of the type in which at least one vertebra is provided for stiffening the wiping strip, the vertebra extending substantially over the length of the wiping strip, fourthly of the type in which the wiping strip is immobilised longitudinally with respect to the said structure, and fifthly of the type including at least one accessory mounted on the remainder of the blade, is characterised in that the said accessory includes, for fastening it on the remainder of the blade, at least one fastening lug interposed between a said grip and the claw portion of the wiping strip.

In some embodiments of the invention, each said fastening lug includes a longitudinal tongue which is interposed between the associated grip and an upper surface of the claw portion, together with a bridge portion which extends substantially perpendicularly from the tongue towards the accessory.

The longitudinal tongue is preferably received in a longitudinal recess formed in the upper surface of the claw portion.

Preferably, the bridge portion is arranged in a plane offset with respect to the plane of the longitudinal tongue, so as to straddle a longitudinal edge of the recess.

A longitudinal edge of the recess preferably has at least one notch through which a bridge portion passes.

According to a preferred feature of the invention in some embodiments thereof, a slide strip is interposed between the longitudinal tongue or tongues and the upper surface of the claw portion or the corresponding said grip. The slide strip may be a continuous strip which extends over the whole length of the wiping strip. In some embodiments of the invention, the slide strip constitutes a dorsal vertebra for stiffening the wiping strip.

According to another preferred feature of the invention in some embodiments thereof, the accessory has a set of fastening lugs which are so made that the tongues constitute a continuous longitudinal fastening strip or band which lies against the upper surface of the claw portion, and which is straddled by the fastening grips and joined to the accessory through a set of bridge pieces.

The continuous longitudinal fastening band of the accessory preferably constitutes a dorsal stiffening vertebra.

Further features and advantages of the invention will appear more clearly on a reading of the following detailed description of preferred embodiments of the invention, which is given by way of example only and with reference to the accompanying drawings.

BRIEF DESCRIPTION OF THE DRAWINGS

In the drawings, those elements which are identical or similar to each other are indicated by the same reference numerals.

DESCRIPTION OF PREFERRED EMBODIMENTS OF THE INVENTION

Figure 1:
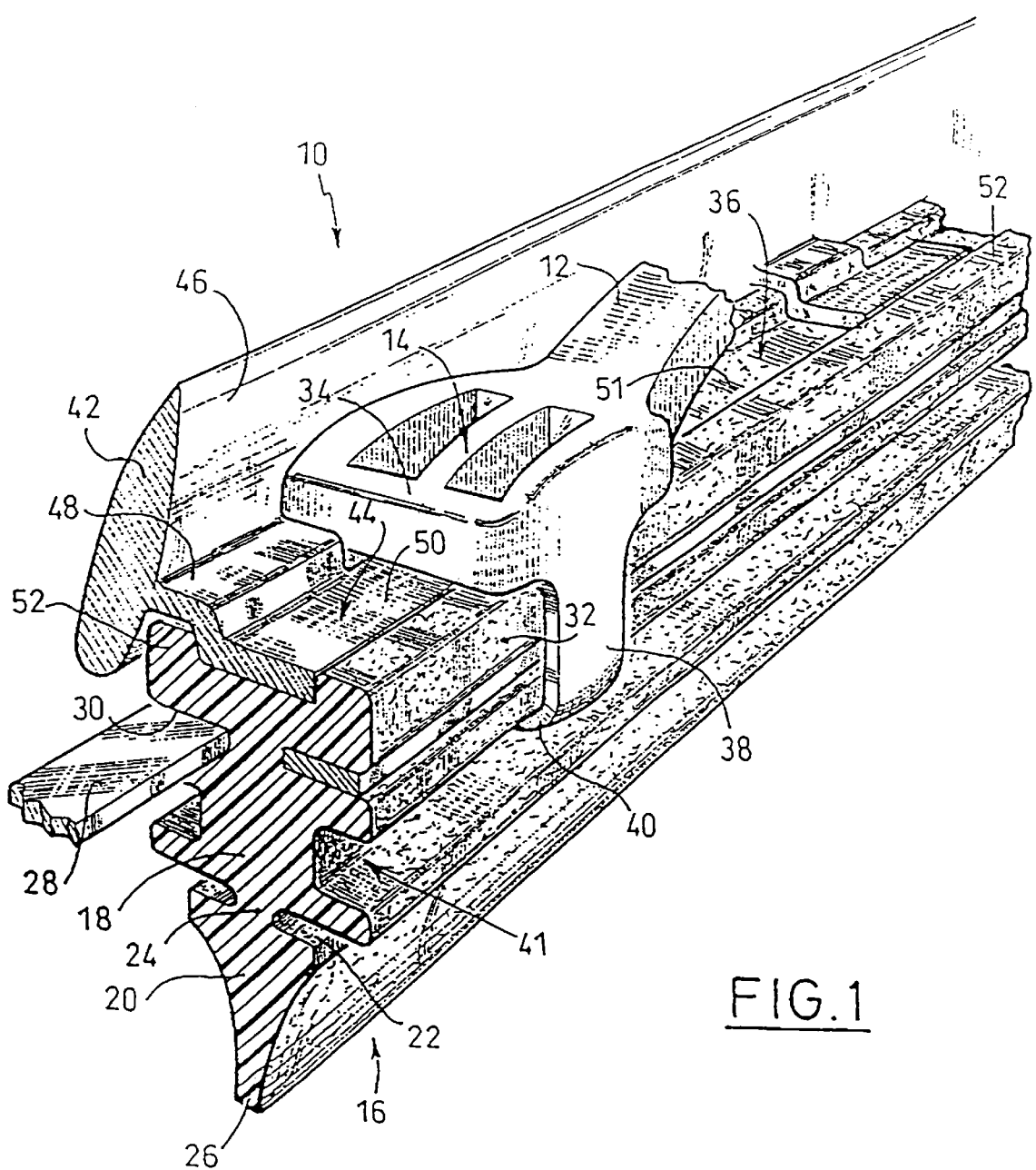
FIG. 1 is a perspective view, shown partly cut away, of part of a screen wiper blade in a first embodiment of the invention.

Referring first to FIG. 1, a screen wiper blade 10 has an articulated structure (not shown), which, in the well known way, comprises a main yoke and a plurality of secondary yokes, the secondary yokes being articulated to each end of the main yoke. A further set of secondary yokes, carried by the first mentioned set of secondary yokes, may also be included. Each of the ends 12 of the various components of the articulated structure includes a grip 14, for fastening a wiping strip 16 to the yoke structure.

The articulated yoke structure is deformable in a longitudinal plane which is substantially at right angles to the plane of the swept surface, and, under the effect of the pressure applied by a screen wiper arm (not shown), which carries the wiper blade, it applies the wiping strip 16 against the swept surface in such a way that the strip 16 follows the curvature of the glass.

The upper part of the wiping strip 16 consists of a longitudinal support portion or claw portion 18, whereby the strip 16 is fastened in place, the transverse cross section of the claw portion 18 being substantially rectangular; and a wiping lip 20 which has a cross section substantially in the form of an arrowhead. The wiping lip 20 is joined through its base 22 to the claw portion 18 through a thin longitudinal integral band 24 which constitutes a hinge, while the free edge, or point, 26 of the wiping lip 20 is arranged to rub over the swept surface.

In a manner known per se, the wiping strip 16 is provided with two longitudinal stiffening vertebrae 28 having a rectangular cross section, which are received in corresponding grooves 30 formed in each of the respective lateral faces 32 of the claw portion 18.

Each grip 14 has a transverse cross section in the form of an inverted U which grasps the claw portion 18. In accordance with conventional design, the grip 14 has a head 34 which is arranged in facing relationship with an upper surface 36 of the claw portion 18. Knee portions 38 of the grip 14 extend towards the swept surface from the head 34 at the top of the grip 14, along the lateral faces 32 of the claw portion 18. The free ends 40 of the knee portions 38 are bent back transversely inwardly, in facing relationship with each other. Each of these free ends 40 is received in a longitudinal groove 41 formed in the corresponding lateral face 32 of the claw portion 18, below the grooves 30 for the stiffening vertebrae 28.

In this way, the grips 14 hold the claw portion 18 of the wiping strip 16 in place, and also prevent the lateral stiffening vertebrae 28 from escaping sideways out of their grooves 30.

Means (not shown), of a known type, are also provided for preventing any longitudinal displacement of the vertebrae 28 with respect to the claw portion 18, and for holding the wiping strip 16 in position with respect to the articulated structure of the wiper blade, or at least to limit the amplitude of any such displacements. Generally, these retaining means comprise longitudinal immobilising means in the region of one of the grips 14 of the articulated structure, the other grips 14 being mounted for longitudinal sliding movement on the wiping strip 16.

The wiper blade 10 shown in FIG. 1 includes an aerodynamic deflector 42 which is made of a suitable flexible material and which is mounted on the wiping strip 16. As can be seen most particularly in FIG. 3, the deflector 42 is provided, for the purpose of fastening it on the blade, with a set of fastening lugs 44 which extend substantially transversely from a lateral face 46 of the deflector that faces towards the wiping strip 16.

Each lug 44 comprises a bridge portion 48 which extends from the deflector 42 and which includes at its free end a longitudinal tongue 50. This tongue 50 is arranged to lie against the upper surface 36 of the claw portion 18. More particularly, the tongue 50 is arranged to be interposed between the upper surface 36 of the claw portion 18 and the head 34 of the grip 14.

In the first embodiment shown in FIG. 1, the upper surface 36 of the claw portion 18 is formed with a longitudinal recess 51, in which the tongue 50 of each of the lugs 44 is received. Thus it is possible to make use of such a method of fastening the aerodynamic deflector 42 in position without modifying the profile and design of the grips 14, while reducing the overall height of the assembly and thereby limiting its resistance to air flow. However, this design does call for the bridge portions 48 to be located in a plane which is offset vertically upwardly with respect to the plane of the tongues 50, so as to straddle, but not to interfere with, the side edges 52 of the recess 51 formed in the upper surface 36 of the claw portion 18.

It is possible to carry out the fitting of the deflector 42 on the wiper blade 10 in two ways. The first way of achieving this consists in mounting the wiping strip 16, with its vertebrae 28 having been fitted beforehand, in the usual way. The tongues 50 of each of the lugs 44 of the deflector 42 are subsequently introduced into the longitudinal recess 51 in the upper surface 36 of the claw portion 18, outside the grips 14. Finally, the deflector 42 and its lugs 44 are displaced longitudinally in such a way as to engage each tongue 50 under the corresponding grip 14. The tongue 50 is then trapped between the recess 51 and the head of the grip 14, and the deflector 42 is thus fastened in place.

It may be arranged that the deflector 42 is immobilised against longitudinal displacement by providing, on the upper surface 54 of the tongue 50 of one of the fastening lugs 44, two nibs 56 (see FIG. 3), which define between them a longitudinal seating 58 in which the head 34 of the grip 14 is received when the deflector 42 is in its fitted position. As a result, one of the nibs 56 is forcibly engaged under the grip 14 during the fitting operation, and it is arranged that the nib 46 has an inclined flat surface 60 so as to facilitate this forcible engagement.

In the second method of fitting the deflector 42 on the wiper blade 10, the operations are carried out in the reverse order, that is to say the tongue 50 of each of the fastening lugs 44 of the deflector 42 is first located between the knee portions 38 of the associated grip 14, the wiping strip 16 subsequently being fitted in a known way by sliding it longitudinally between the grips 14, or alternatively by transverse seaming of the grips 14 in their grooves 41.

In this latter case, it can be arranged that one of the side edges 52 of the recess 51 is provided with notches, which enable the bridge portions 48 of the lugs 44 to be brought into the same plane as that of the tongues 50, without imposing any deformation on the side edge 52.

Figure 2:
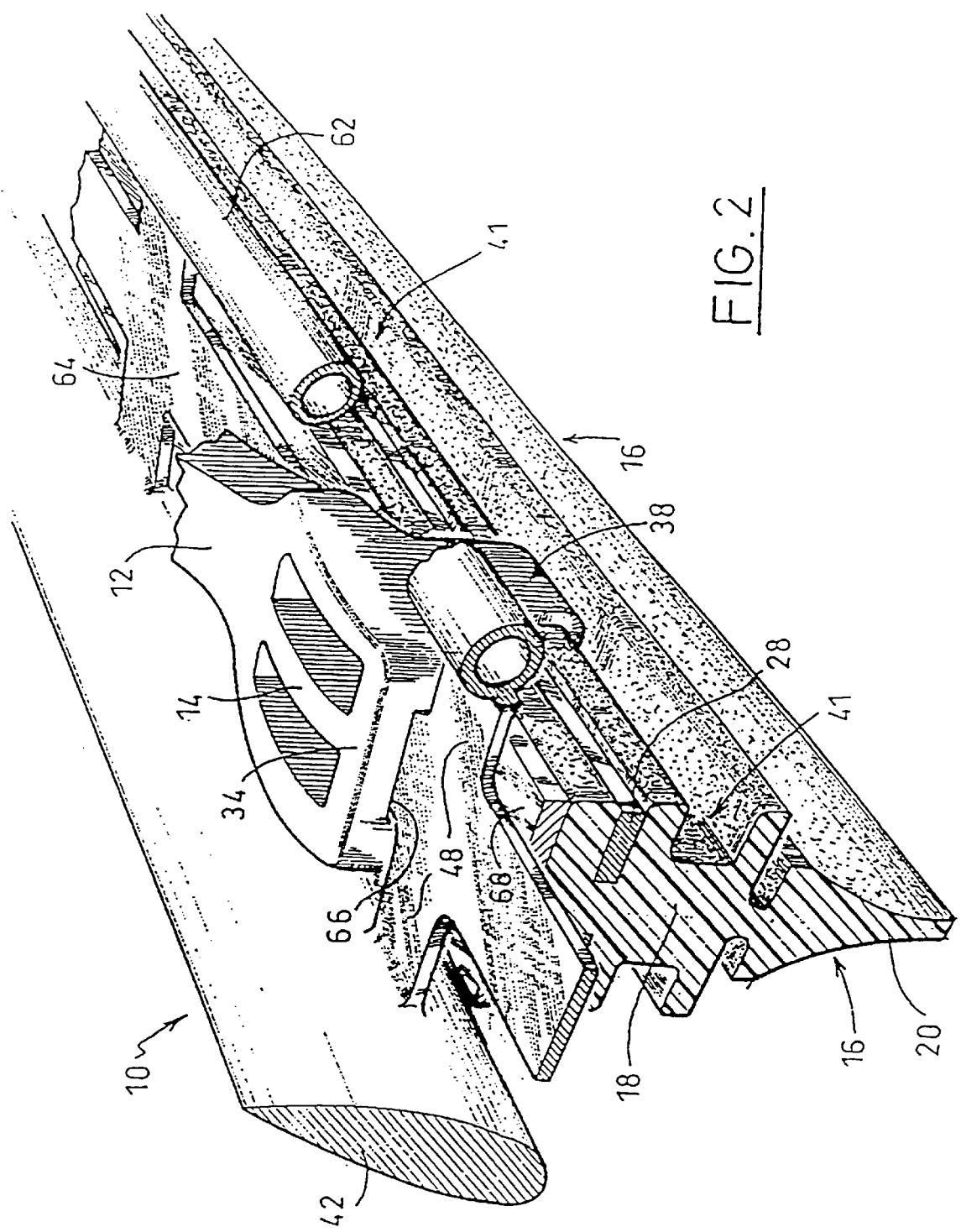
FIG. 2 is a view similar to FIG. 1 showing a second embodiment of a screen wiper blade according to the invention.

Reference is now made to FIG. 2, showing a second embodiment of wiper blade according to the invention. In this embodiment, two accessories are disposed on either side of the wiping strip 16, namely an aerodynamic deflector 42 and a spray pipe 62. The deflector 42 and spray pipe 62 are formed simultaneously, and are mounted on the wiping strip 16 by means of common fastening lugs 44.

Figure 3:
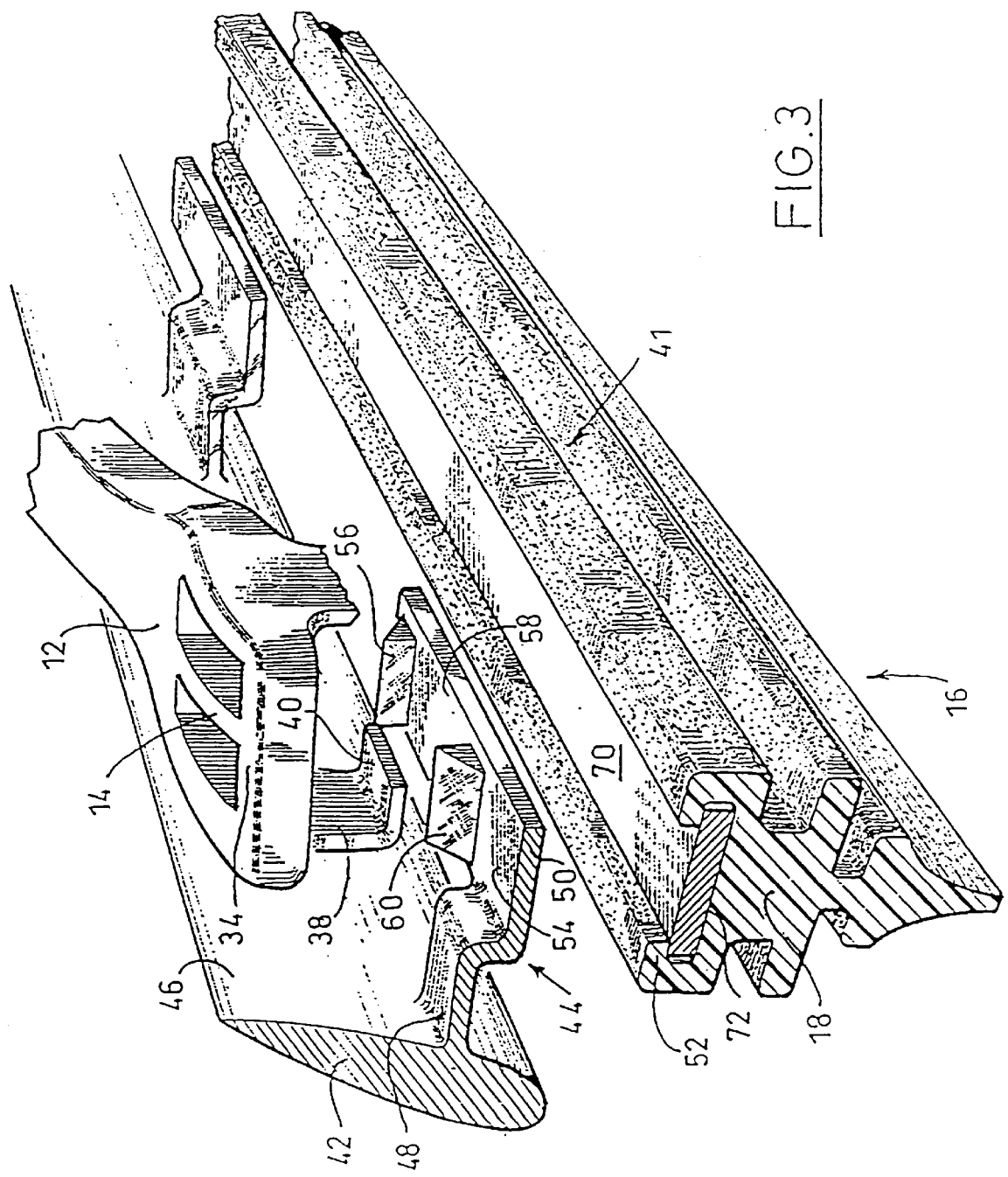
FIG. 3 is a view similar to FIG. 1 showing a third embodiment of a screen wiper blade in accordance with the invention.

A second feature of this particular embodiment is that the fastening lugs 44 for the accessories 42 and 62 comprise a common longitudinal strip 64 which has the same function as the tongues 50 of the fastening lugs in FIGS. 1 and 3. Bridge portions 48 are again provided, and these join the longitudinal fastening strip 64 to each of the accessories 42 and 62.

As FIG. 2 shows, the strip 64 is not received in any recess formed in the upper surface 36 of the wiping strip 16. It is however immobilised transversely by the grips 14, the heads 34 of which are for this purpose provided with a recess 66 in which the longitudinal strip is received.

Finally in this second embodiment, a slide strip 68 is interposed between the upper surface 36 of the claw portion 18 and the longitudinal strip 64 for fastening the accessories 42 and 62. Thus, when the wiping lip 20 deforms by following the curvature of the swept surface, the fastening strip 64 is free to slide both with respect to the wiping strip 16 and with respect to the grips 14, without the occurrence of any very significant friction which could interfere with the change of shape of the wiping strip as it follows the curvature of the glass. Alternatively, as shown in FIG. 1, a slide strip can be interposed between the longitudinal tongues and a corresponding grip.

Referring once again to FIG. 3 showing the third embodiment of the invention, this differs from the first embodiment shown in FIG. 1 mainly in that the two lateral vertebrae 28, which in FIG. 1 were arranged in the side flanks of the claw portion 18, are in the present example replaced by a single dorsal vertebra 70, which is received in a recess 72 in the upper surface 36 of the claw portion 18. The stiffening vertebrae being generally made of metal, this arrangement avoids the need to interpose a slide strip as in FIG. 2, while retaining a good facility for sliding movement between the grips 14, the lugs 44 which fasten the accessories 42 and 62, and the wiping strip 16.

Figure 4:
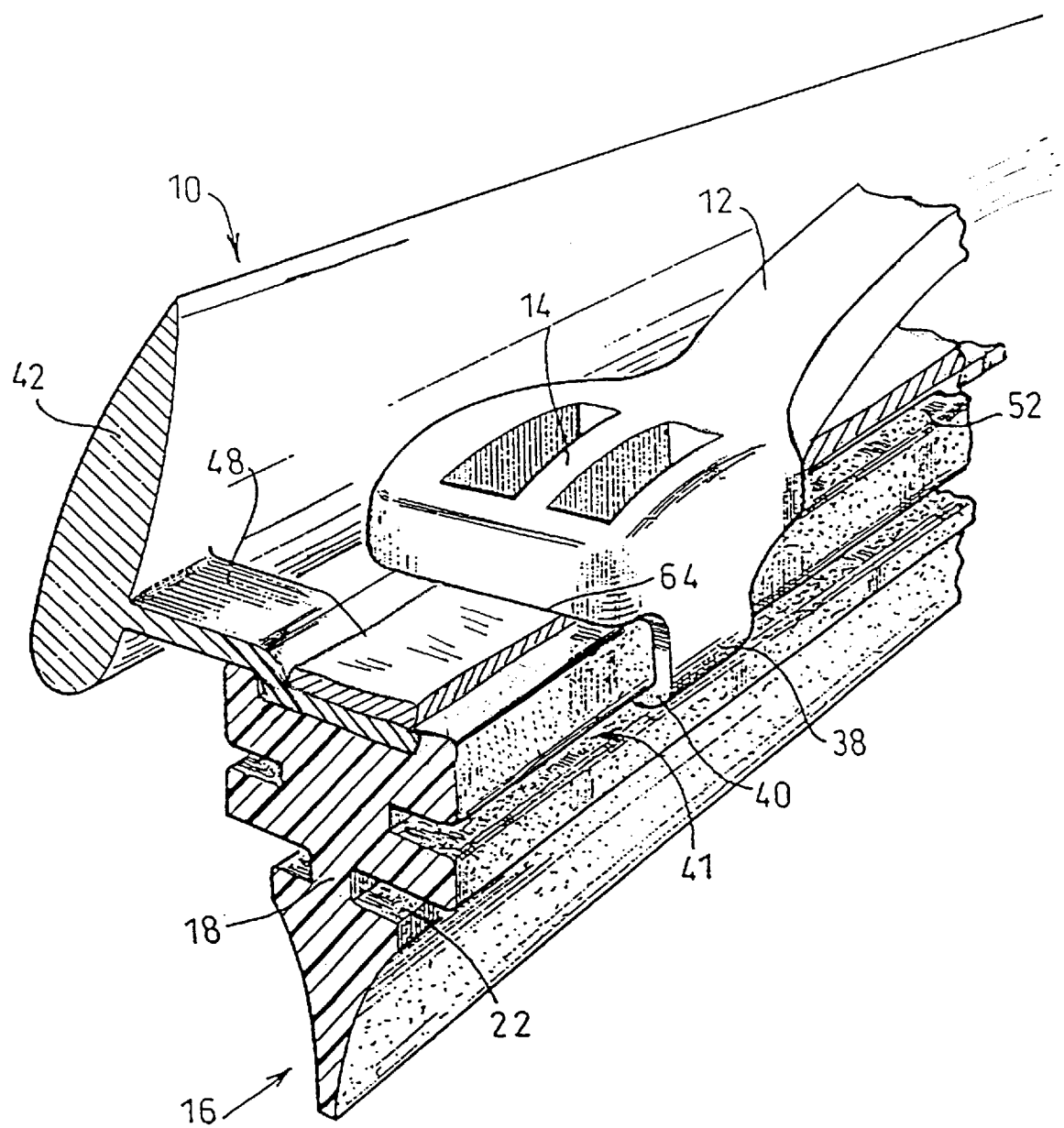
FIG. 4 is a view similar to FIG. 1 showing a fourth embodiment of a screen wiper blade in accordance with the invention.

Reference is now made to FIG. 4 showing a fourth embodiment of the invention, in which the accessory 42 is fixed, as in FIG. 2, by means of a longitudinal fastening strip. However, in the arrangement shown in FIG. 4, the longitudinal fastening strip 64 is so dimensioned that it also provides stiffening for the wiping strip 16, thereby replacing the stiffening vertebrae.

In this connection, in order to provide transverse stiffening for the wiping strip 16, it is necessary that the strip 64 be received in a longitudinal recess 51 which is formed in the upper surface 36 of the claw portion 18, so that the edges 52 of this recess 51 bear transversely on the longitudinal strip 64.

The embodiment shown in FIG. 4 is of particular advantage in that it enables the fastening of the accessory, such as the deflector 42, and the stiffening of the wiping strip, to be achieved by the use of a single integral component, while reducing the height of the wiping strip 16 because of the elimination of the stiffening vertebrae and of the slots in which they are received. In this way, the height of the wiping strip of the screen wiper blade is reduced by a particularly large amount.

In one further embodiment of the invention, which is not shown in the drawings, it is possible to arrange that the accessory 42 and/or 62 be fixed on a lateral vertebra which is made integrally with the accessory itself, and which is held in position by the grips in a lateral groove formed in the claw portion of the wiping strip.

What is claimed is:

1. A wiper blade for wiping a glass surface having a curvature, the wiper blade comprising:
    an articulated structure having a set of grips;
    an elongated wiping strip of flexible material carried by the grips so as to be applied against the glass surface, the wiping strip including a claw portion having an upper surface, the grips grasping the claw portion;
    means for immobilizing the wiping strip longitudinally with respect to the articulated structure; and
    at least one accessory mounted on the blade, wherein the accessory includes at least one fastening lug having a longitudinal tongue extending along the length of the wiper strip and interposed between one of the grips and the upper surface of the claw portion of the wiping strip, thereby fastening the accessory in place.

2. A wiper blade according to claim 1, wherein the at least one fastening lug further includes a bridge portion extending from the tongue to the accessory to the tongue.

3. A wiper blade according to claim 2, wherein the claw portion has a longitudinal recess formed in the upper surface, the longitudinal tongue being received in the recess.

4. A wiper blade according to claim 3, wherein the longitudinal tongue defines a first plane and the bridge portion defines a second plane offset from the first plane, the longitudinal recess has a longitudinal edge, and the bridge portion straddles the said longitudinal edge.

5. A wiper blade according to claim 3, wherein the said longitudinal recess has a longitudinal edge formed with at least one notch, the blade further including a bridge portion traversing said at least one notch.

6. A wiper blade according to claim 3, further including a slide strip interposed between the longitudinal tongues and the upper surface of the claw portion.

7. A wiper blade according to claim 3, further including a slide strip interposed between the longitudinal tongues and the corresponding said grip.

8. A wiper blade according to claim 3, further including a slide strip engaged by the said longitudinal tongues, the slide strip being a continuous strip extending over the whole length of the wiping strip.

9. A wiper blade according to claim 8, wherein the slide strip is also a dorsal stiffening vertebra for the wiping strip.

10. A wiper blade according to claim 2, including two said accessories disposed in facing relationship on either side of the wiping strip, the wiper blade including a common longitudinal tongue which comprises two opposed bridge portions, each extending from the tongue towards a respective said accessory at right angles to the latter, whereby to secure the accessories.

11. A wiper blade according to claim 1, further including complementary means for limiting longitudinal displacement of at least one said fastening lug with respect to the articulated structure.

12. A wiper blade according to claim 1, wherein the at least one fastening lug is integral with the accessory.

13. A wiper blade according to claim 1, wherein the accessory is a flexible aerodynamic deflector extending along the wiping strip.

14. A wiper blade according to claim 1, wherein the said accessory is a spray pipe extending along the wiping strip.

15. A motor vehicle screen wiper having a wiper arm and a wiper blade connected to the wiper arm, wherein the wiper blade includes:
    an articulated structure having a set of grips;
    an elongated wiping strip of flexible material carried by the grips so as to be applied against the glass surface, the wiping strip including a claw portion having an upper surface, the grips grasping the claw portion;
    means for immobilizing the wiping strip longitudinally with respect to the articulated structure; and
    at least one accessory mounted on the blade, wherein the accessory includes at least one fastening lug having a longitudinal tongue extending along the length of the wiper strip and interposed between one of the grips and the upper surface of the claw portion of the wiping strip, thereby fastening the accessory in place.

* * * * *